W. L. CAREY.
SLIDE VALVE ENGINE.
APPLICATION FILED NOV. 20, 1911.
1,056,736.
Patented Mar. 18, 1913.
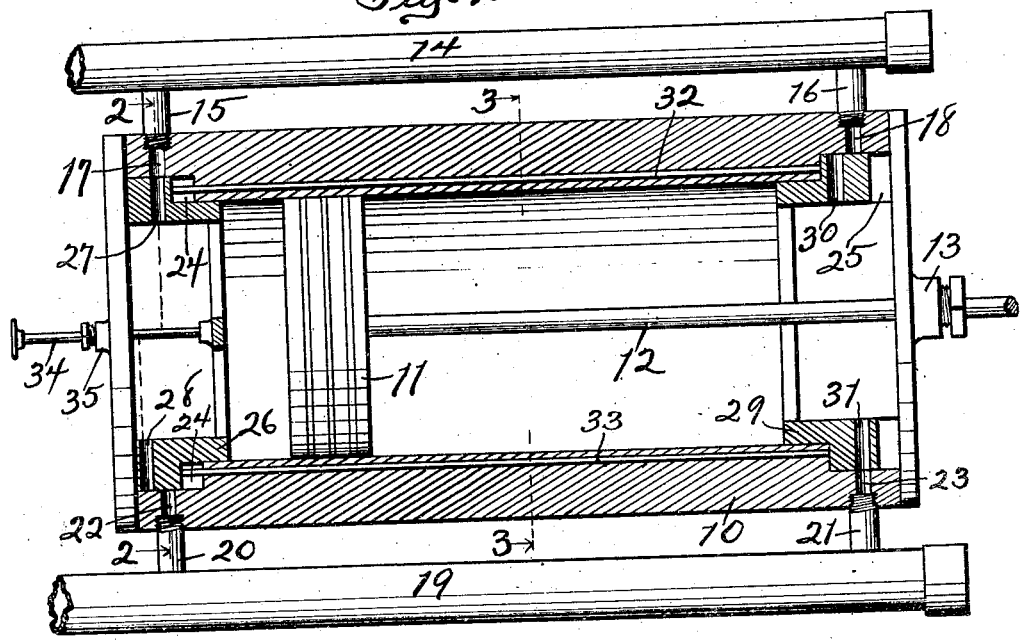
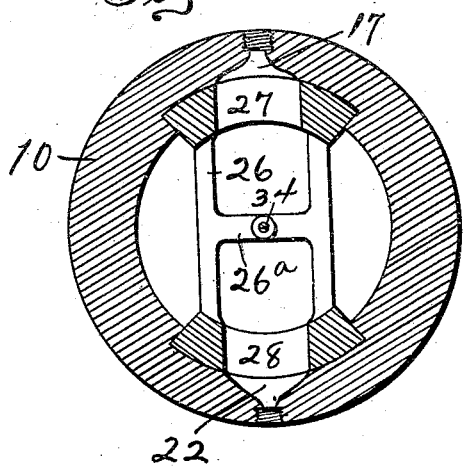
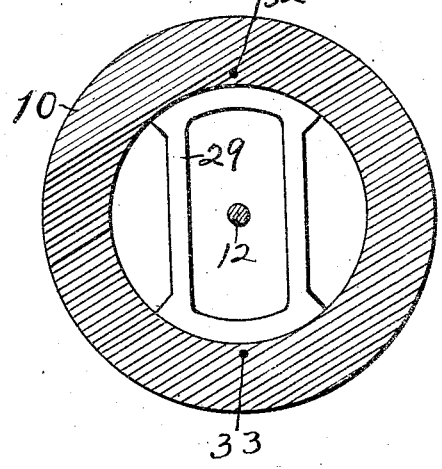
Attest:
Erle W. Miller
Earl M. Sinclair
Inventor:
W. L. Carey
By JLeSweet Atty

UNITED STATES PATENT OFFICE.

WILLIAM L. CAREY, OF LARIMORE, NORTH DAKOTA.

SLIDE-VALVE ENGINE.

1,056,736.  Specification of Letters Patent.  Patented Mar. 18, 1913.

Application filed November 20, 1911.  Serial No. 661,334.

*To all whom it may concern:*

Be it known that I, WILLIAM L. CAREY, citizen of the United States of America, and resident of Larimore, Grand Forks county, North Dakota, have invented a new and useful Slide-Valve Engine, of which the following is a specification.

My invention relates to reciprocating steam engines and has for its object the provision of an improved means for controlling the inlet and exhaust of steam to and from the steam cylinder consisting of valves slidably mounted in the two ends of the cylinder and connected together for simultaneous operation, said valves being adapted to be engaged by the reciprocating piston to properly position them for the inlet and exhaust of steam during the operation of the engine.

My invention consists in the construction, arrangement and combination of elements hereinafter set forth, pointed out in my claims and illustrated by the accompanying drawing, in which—

Figure 1 is a longitudinal sectional elevation of the device. Fig. 2 is a cross-section on the indicated line 2—2 of Fig. 1. Fig. 3 is a cross-section on the indicated line 3—3 of Fig. 1.

In the construction of the device as shown the numeral 10 designates a steam cylinder in which a piston 11 is mounted for reciprocation and provided with a piston rod 12 passing through a gland 13 in one cylinder head. A steam supply pipe 14 is mounted parallel with and contiguous to the cylinder 10 and is formed with branches 15, 16 communicating with valve ports 17, 18 opening to opposite end portions of said cylinder. A steam exhaust pipe 19 is mounted parallel with and contiguous to the cylinder 10 on the opposite side thereof from the supply pipe 14 and is formed with branches 20, 21 communicating with valve ports 22, 23 opening to opposite end portions of said cylinder. The cylinder 10 is formed with slideways 24 in diametrically opposite sides of one end portion and slideways 25 in diametrically opposite sides of the opposite end portion. A valve plug 26 of skeleton form is mounted in and adapted for limited travel through the slideways 24. The valve plug 26 is formed with a valve port 27 adapted to register at times with the live steam port 17 and with a valve port 28 adapted to register at other times with the exhaust port 22. A valve plug 29 of skeleton form is mounted in and adapted for limited travel through the slideways 25. The valve plug 29 is formed with a valve port 30 adapted to register at times with the live steam port 18 and with a valve port 31 adapted to register at other times with the exhaust port 23. The arrangement of valve ports is such that the live steam passage at one end and the exhaust passage at the opposite end of the cylinder are open simultaneously and closed simultaneously. The valve plugs 26, 29 are connected for simultaneous travel by rods 32, 33 fixed at their ends to said plugs and extending through longitudinal holes in the wall of the cylinder at opposite sides of and parallel with the bore thereof.

In practical use of the device, beginning with the parts in the positions shown, live steam from the pipe 14 passes through the branch 15, port 17, and port 27 to the cylinder and acts to force the piston to the opposite end of the cylinder, the exhaust taking place through the port 31, port 23, branch 21 and pipe 19. When near the end of its stroke the piston 11 impacts the valve plug 29 and forces it rearwardly in the slideways 25, and the valve plug 26 also is moved in its slideways 24 through the connecting rods 32, 33. This has the effect of reversing the various valve ports, and thereafter live steam from the pipe 14 passes through the branch 16, port 18 and port 30 to act on and move the piston in the opposite direction, the exhaust taking place through the port 28, port 22, branch 20 and pipe 19. At the end of its stroke the piston 11 impacts the valve plug 26 and again changes the ports to the initial positions. This operation is successively repeated while the engine is moving forwardly.

To reverse the engine I have provided a reversing rod 34 passing through a gland 35 in a head of the cylinder and screwed into a seat in a cross-bar 26ª of the valve plug 26. When it is desired to reverse the engine the reversing rod 34 is actuated when the piston 11 is near the middle of a stroke to the end of changing the positions of the valve plugs 26, 29 before such stroke is completed. This has the effect of changing the arrangement of steam and exhaust valves and altering the direction of the engine.

I claim as my invention—

1. In a slide valve engine, a cylinder, a piston reciprocally mounted in said cylinder, a steam pipe having communication with said cylinder at the opposite ends thereof, an exhaust pipe having communication with said cylinder at the opposite ends thereof and diametrically opposite the steam entrances aforesaid, slideways provided in the ends of the cylinder communicating with the steam entrances and exhaust ports, valves slidably mounted in said slideways and having openings adapted to aline with the steam entrances and exhaust ports, the valves at each end of the cylinder being connected for simultaneous movement, and the valves at the two ends of the cylinder being connected for movement simultaneously.

2. In a slide valve engine, a cylinder, a piston slidably mounted in said cylinder, the ends of said cylinder having ports therein oppositely disposed, slideways communicating with said ports, and bores extending longitudinally of the cylinder and terminating in the walls of said slideways, valves slidably mounted in said slideways and having openings therein adapted to aline with the ports aforesaid, said valves being connected in pairs at the ends of the cylinders for simultaneous movement, and rods slidably mounted in the bores aforesaid and engaging said valves, said valves being adapted to be engaged by the piston aforesaid to adjust them.

3. In a slide valve engine, a cylinder having steam ports adjacent to its two terminals, and exhaust ports oppositely disposed to said steam ports, said cylinder being provided with slideways in the interior thereof and adjacent to its ends, said slideways communicating with the ports aforesaid, said cylinder also being formed with bores extended longitudinally thereof and connecting the slideways aforesaid in pairs, valves slidably mounted in said slideways and provided with openings adapted to aline with the ports aforesaid, the valves at the two ends of the cylinder being connected for simultaneous movement, and rods slidably mounted in the bores in the cylinder and connecting the valves in the two ends of the cylinder for simultaneous movement.

Signed by me at Larimore, North Dakota, this thirteenth day of October, 1911.

WILLIAM L. CAREY.

Witnesses:
M. A. CARTER,
ED. JOHNSON.

---

Copies of this patent may be obtained for five cents each, by addressing the "Commissioner of Patents, Washington, D. C."